Jan. 15, 1957         B. H. WOODRUFF         2,777,393
APPARATUS FOR MAINTAINING A PREDETERMINED
QUANTITY OF LIQUID IN A CLOSED SPACE
Filed Feb. 12, 1951                                           2 Sheets-Sheet 1
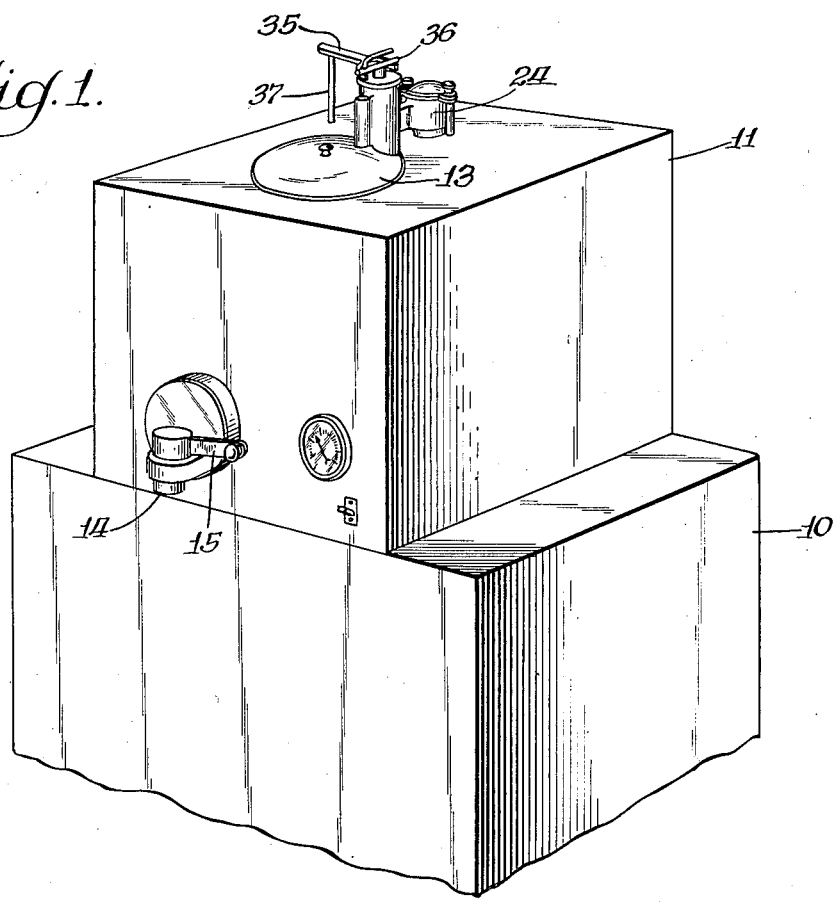
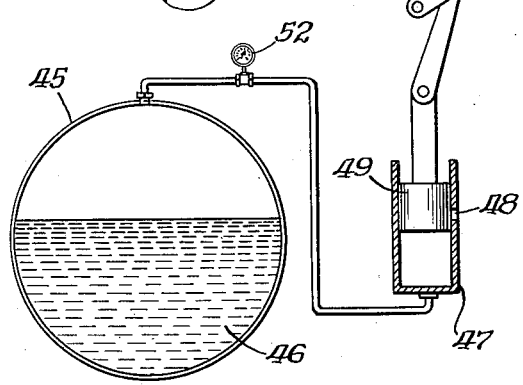
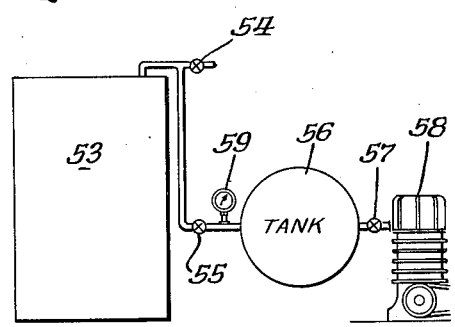
INVENTOR.
Ben H. Woodruff
BY
Foorman L. Mueller
Atty.

United States Patent Office 2,777,393
Patented Jan. 15, 1957

2,777,393

APPARATUS FOR MAINTAINING A PREDETERMINED QUANTITY OF LIQUID IN A CLOSED SPACE

Ben H. Woodruff, Chicago, Ill.

Application February 12, 1951, Serial No. 210,579

9 Claims. (Cl. 103—7)

This invention relates to a method of and apparatus for determining the quantity of material in a space and more particularly to the measurement and control of the volume of non-gaseous material in a closed space also containing a gas such as air.

There are many cases where it is difficult to determine the quantity of material in a container by direct measurement of the level, due to irregular container shape, or irregular shape of solid material in the container. It is further desirable in many cases to obtain an indication of the quantity of material at a remote point or to control the supply of material to maintain its quantity at a desired value. Remote indication and control are also frequently difficult with direct measurement of level.

One specific problem encountered is that of controlling the feeding of liquid mix to a machine for making frozen custard, ice cream, and like frozen products, to maintain the quantity of product in the freezer substantially constant. In frozen custard machines and the like the freezing container must not be completely filled as this will prevent the beater from whipping air into the product as it is being frozen, but it is desired that the maximum permissible quantity of product be maintained in the freezing chamber to provide the greatest possible quantity of frozen product ready for dispensing. In such machines, both the mix and the frozen product are in a liquid or fluid state and are referred to herein as liquids, the product being designated "frozen custard" for convenience of description regardless of its exact makeup or character.

To obtain the maximum output of frozen product from such machines it is necessary to supply replacement mix to the freezing container as the product is withdrawn and it is difficult to obtain an accurate measurement of the material remaining in the container, since it is continuously agitated during the freezing operation, during which time it is changed from a free flowing fluid into a thicker substance with an accompanying increase in the volume of the frozen product. This percentage of volume increase during the freezing operation is variable between rather wide limits, being subject to several factors such as whipping time, temperature, nature of liquid mix, etc. so that there is no dependable relationship between the volumes of the mix fed into the machine and the frozen product being withdrawn. Also, the mix being fed is quite fluid and will flow readily while the discharged product is relatively stiff and flows irregularly, preventing a satisfactory control by relating the size of the input and outlet orifices.

It is one of the objects of the present invention to provide a method and apparatus of determining the quantity of material in a space in which the quantity is accurately measured by varying the quantity of gas in the space relative to the volume thereof and then measuring a characteristic such as the pressure or volume of the gas.

Several different methods and different types of apparatus are contemplated by the invention, including forcing non-gaseous material into or out of the space under a predetermined pressure and measuring the change in volume or pressure of the gas in the space as indicated by the quantity of material forced into or out of the space, forcing a predetermined volume of gas into or out of the space or effecting a predetermined change in the volume of the space and measuring the change in gas pressure or connecting the space to a second space containing a known volume of gas at a known pressure and measuring the change in pressure.

Another object of the invention is to provide a method and apparatus in which the addition or subtraction of material to or from the space is controlled in response to the measurement of pressure or volume to maintain the quantity of material in the space at a desired value.

According to one feature of the invention, material is supplied to the space from a communicating supply chamber in batches of relatively small size at frequent intervals. In frozen custard machines, this is preferred to feeding large quantities at less frequent intervals.

A further object is to provide a method and apparatus for use with frozen custard machines by which the quantity of mixture in the freezing container of the machine is periodically sensed through a characteristic of the air in the container and additional mixture is added as needed to maintain the quantity constant.

Another feature of this invention is the provision of a frozen custard machine having a freezing container and a storage chamber for the mix yet to be frozen, with means for automatically maintaining a predetermined quantity of mixture in the freezing container including a pump for drawing an amount of mix from the storage chamber into a supply chamber which depends upon the quantity of mixture in the freezing container, and a syphon for supplying a fixed amount of mix from the supply chamber to the freezing chamber when and if the mix reaches a predetermined level in the supply chamber.

The above and other objects and advantages of the invention will be more readily apparent from the following description when read in connection with the accompanying drawing in which:

Figure 1 is a partial perspective view of a frozen custard machine having a measuring and feeding mechanism embodying the invention;

Figures 3 and 4 which are diagrammatic views illustrating alternative embodiments of the present invention.

Figure 2:
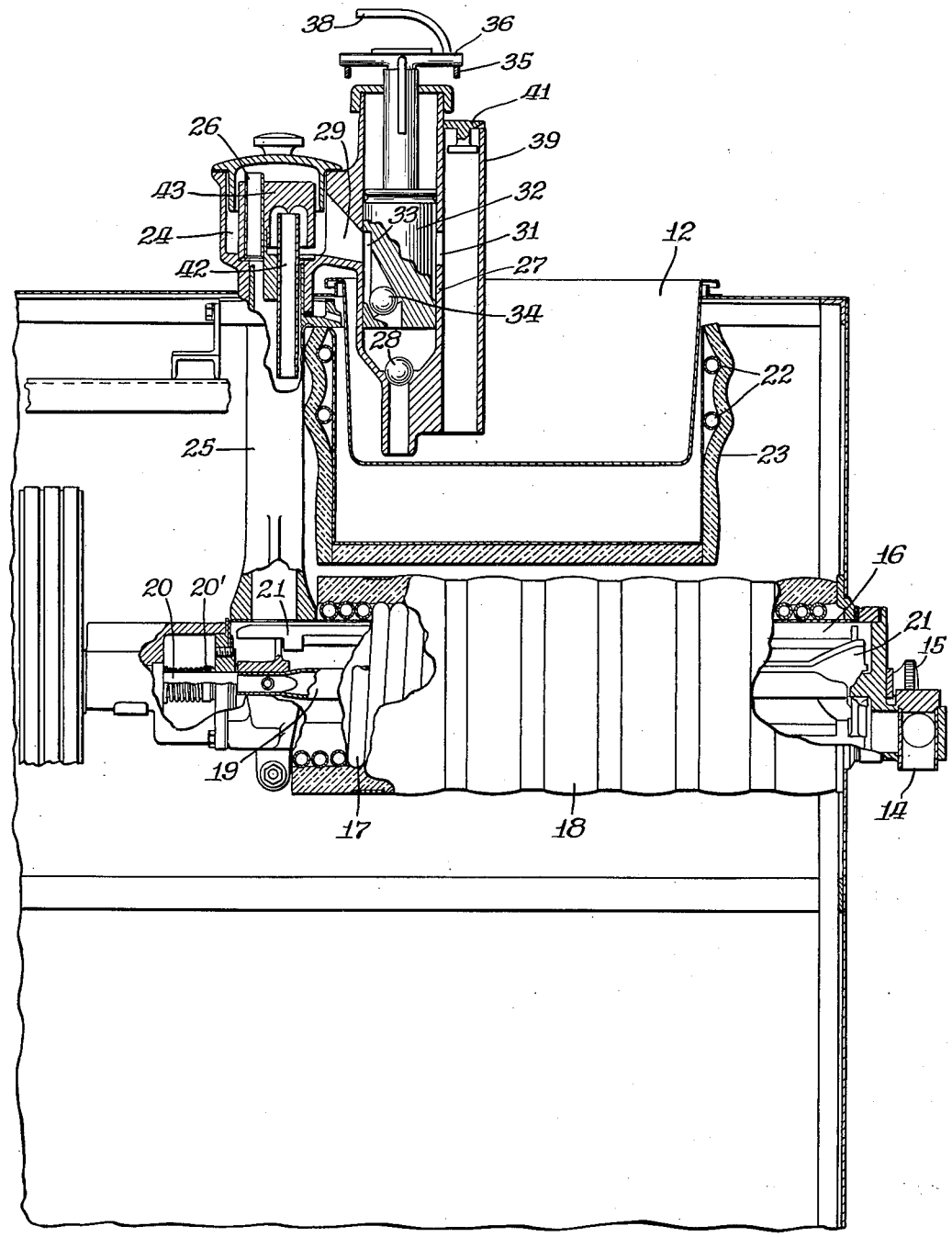
Figure 2 is a partial vertical section of the machine illustrating the measuring and feeding mechanism.

The frozen custard machine shown in Figures 1 and 2 comprises a cabinet having an enlarged base 10 in which refrigerating machinery may be housed to provide refrigeration for the freezing operation and which may also serve in some cases as a storage cabinet. An upper casing part 11 is mounted on the base 10 and contains the freezing and feeding mechanism. The fresh liquid mix is placed in the top of the cabinet, or at any other convenient point, in a storage chamber 12 closed by cover 13 and the completed frozen product is withdrawn through a hollow plug type nozzle 14 manually controlled by a handle 15.

As best seen in Figure 2, the mechanism includes a freezing container 16 mounted on a horizontal axis and cooled by refrigerating coils 17 wrapped around it. The container and coils may be insulated by a covering 18 and may contain a rotatable beater including a shaft 19 extending axially through the container and carrying a series of scrapers or paddles 21. The beater is driven through a shaft 20 sealed by a seal 20' by means of an electric motor or other suitable power mechanism not shown.

In the operation of this machine, liquid mix is fed into the container 16 and is whipped by the beaters or paddles 21 while being cooled by the refrigerating coils. The completed product which is a relatively stiff although still fluent material is withdrawn by opening the valve 14 as desired. The withdrawals may be relatively small quantities as, for example, in serving ice cream cones or filling small containers, or may be in relatively large quantities and may be substantially continuous during busy periods. It is desired to maintain a substantially constant quantity of material in the freezing container at all times and not to withdraw it for storage before serving since its quality and flavor are altered by storage. It is therefore essential for the proper operation of machines of this type that replacement mix be supplied to the freezing container at substantially the maximum rate at which it can be frozen, ready for serving, yet not to over-fill the freezing container since a certain minimum air space is necessary.

Mix to be supplied to the freezing container is held in a storage chamber 12 which is preferably cooled by refrigerating pipes 22 and is insulated by an insulating cover 23. The mix in the storage chamber 12 which is in liquid condition is pumped therefrom into a closed supply chamber 24 and through pipe 42 to a vertical conduit 25 communicating with the end of the freezing container remote from the valve 14. As shown, a small pipe 26 connects the upper part of the supply chamber 24 with the freezing container to equalize the pressures therein at all times, even during a feeding operation.

The liquid mix is pumped from the storage chamber into the supply chamber in the embodiment shown in Figures 1 and 2 by a pump which develops a pressure approaching or equal to a predetermined maximum pressure on each operation. The pump, as shown, is a vertical cylinder 27 having an inlet opening at its bottom communicating through a check valve 28 with the storage chamber. The cylinder is formed with a port 29 at one side communicating with the supply chamber 24 and at its other side is formed with a vent port 31 whose lower edge is approximately at the level of the bottom of the supply chamber 24. A piston 32 is slidable vertically in the cylinder and is formed with a passage connecting the bottom surface of the piston with a side port 33 therein which registers with the port 29 during the suction and discharge portions of the piston stroke. An upwardly opening check valve 34 is provided in this passage to prevent downward flow of material through the piston.

The piston may be operated continuously at a suitable rate as, for example, one cycle each fifteen seconds. For each cycle of operation the piston is raised by a yoke member 35 engaging the lower sides of a cross pin 36 carried by the piston. The yoke member is raised a predetermined distance at the beginning of each operating cycle through a connecting rod 37, Figure 1, which may be operated by a crank, cam, or the like, driven by suitable motor or other means not shown. When the piston has been raised to the desired level, the yoke is lowered beneath the pin 36, allowing the piston to follow downwardly under its own weight acting as a displacement pump to force the mix from the cylinder space up through the piston valve and port into the supply chamber. Since the piston weight is constant, and since it is not forced to travel downwardly by any means except its own weight, the mix will be forced into the supply chamber solely by the developed pressure of the piston weight, which cannot exceed the pressure predetermined by the piston weight. For ease in cleaning the piston is designed so that it may be lifted out of the cylinder by a handle 38, the yoke 35 preferably being pivoted on the upper end of the connecting rod 37 so that it can then be swung upward and out of the way to permit lifting of the entire remaining cylinder assembly for removal. The yoke 35 is formed to permit the direct withdrawal of the piston without movement of the yoke.

In operation of the device as so far described the freezing container 16 will contain only air at the start of service and will contain a quantity of frozen product and some measure of air at all other times. When the piston 32 is elevated, the vent 31 will be uncovered during the upper portion of the piston travel to vent the supply chamber and freezing chamber to atmosphere through a vent tube 39 having a vented cover 41 therein. At this time, any mix in the supply chamber will flow therefrom across the cylinder and out the vent port 31 to return to the storage chamber through the tube 39. During upward travel of the piston liquid mix from the storage chamber will be drawn into the cylinder so that it will be filled to the lower edge of the vent port 31, when the piston is in its uppermost position.

As the piston starts to lower in response to gravity it will first close the vent port 31 and on further travel will force liquid mix trapped in the cylinder past the check valve 34 and through the ports 33 and 29 into the supply chamber 24. As the liquid enters the supply chamber it will reduce the effective free volume of the freezing container and supply chamber and will, acting as a liquid piston, compress the air contained in the freezing chamber and supply chamber. Eventually, as freezing chamber 16 is filled with mix and the total free volume of the freezing chamber and the supply chamber is reduced accordingly, the pressure developed by the liquid mix being forced into the supply chamber by the falling piston will reach a point at which the piston weight will be balanced by the air pressure acting back through the mix, which will prevent further downward travel of the piston even though the yoke completes its downward travel. The piston's position or level at this time, and the corresponding height of the liquid mix in the pump cylinder, are indicative of the total quantity of air in the freezing chamber and supply chamber and the connecting passage, and since this quantity of air is inversely proportional to the quantity of mixture in the freezing chamber, the quantity of product in the freezing chamber is then indicated.

It is noted that this measurement will be obtained accurately regardless of the fact that the mixture in the freezing container may be agitated during the measuring operation, since it is dependent solely upon compression of the air in the enclosed space constituted by the freezing container and the connected supply chamber. It is also noted that inherent in the operation of this system is the maintenance of a positive pressure on the freezing container during much of the piston stroke which pressure is of assistance in causing the thickened frozen product to flow from the discharge nozzle 14.

Also, it is noted that the air is compressed by the liquid mix rising in the pump cylinder which forms a leak-proof and wear-proof arrangement. The piston is fitted to the cylinder so as to permit a slight blow-by or leakage of the liquid mix to provide lubrication. As the system is used this piston will wear slightly, adding to the mix leakage past the piston. This normal increase in leakage past the piston has no effect upon the proper functioning of this system since, once the maximum air pressure is developed in the supply chamber by the rising mix, the added leakage merely allows the piston to settle slightly lower in the cylinder without changing the level of the liquid mix in the supply chamber or the air pressure in the supply chamber. All fluid mix leaking past the piston is returned directly through vent port 31 to the mix storage chamber, without loss.

To transfer liquid mix from the supply chamber to the freezing container, a vertically extending transfer pipe 42 extends upward through the bottom of the supply chamber, as shown. When this pipe alone is used, its height may be adjusted so that the mix in the supply chamber will just reach its top when the freezing container contains the desired amount of mixture. If less than the desired amount of product is in the freezing container, excess air space will be present and the amount of mix pumped into the supply chamber in one stroke of the pump piston will not be enough to build up the necessary air pressure to balance the weight of the piston, which thus makes a full or nearly full downward stroke. That amount pumped in after the mix reaches the top of the pipe 42 will overflow through the pipe into the freezing container to maintain the desired quantity therein, while the initial quantity of mix will drain back to the storage container when the piston is lifted to its upper position.

Preferably, mix is added to the freezing container in small batches with a minimum amount of re-circulation. Excessive re-circulation tends to churn the mix which is not desirable. For this purpose an inverted cup-shaped cap 43 is mounted over and in spaced relation to the pipe 42 to form therewith a syphon. With this construction, until the mix rises to the top of the cavity in cap 43, there will be no flow through the syphon. However, once the mix rises to this level, it will syphon over into the freezing container until it has dropped to the level of the bottom edge of the cap 43, leaving a relatively small quantity of mix to be drained back to the storage container. Thus, no mix will be added until the quantity displaced into the supply chamber by the piston reaches a predetermined minimum height at which time the small quantity in the supply chamber will be syphoned over into the freezing container, immediately after which the piston starts a new pumping and sensing cycle to supply additional charges of mix when and as needed to maintain the desired quantity in the freezing container. The piston cycles continously when the beater in the freezer is rotating to effect continuous checking or sensing intervals and mix feeding intervals as needed without any attention from the person who is drawing off the frozen product other than keeping a quantity of mix in the storage chamber. The frozen custard machine having this system is then normally always filled to the desired maximum point with product in the freezing container without the need for skilled operator judgment as to the need for more or less mix.

In the alternative arrangement illustrated in Figure 3, a determination of the quantity of material in a container 45 is obtained when desired by forcing a predetermined quantity of air into the container and by measuring the change in pressure. As shown, the container is adapted to contain liquid 46 leaving an air space above the liquid and the air space is connected to a cylinder 47 having an atmospheric vent 48 in one side thereof. A piston 49 is slidable in the cylinder and is moved through a predetermined stroke by rotating crank 51. The pressure of the air in the container may be indicated by a gauge 52.

When the piston 49 rises to uncover the vent 48 the container and cylinder will be vented to atmosphere. As the piston travels down, it will close the vent and will thereafter pump air into the container during the remainder of its downward stroke. The maximum pressure developed as indicated by the gauge 52 forms an accurate measurement of the free air space in the container. Another way of looking at this arrangement is that the cylinder below the vent 48, the connecting pipe and the container form a closed space whose volume is varied a predetermined amount by movement of the piston. In any case, the pressure, as indicated by the gauge 52 will provide an accurate measurement of the quantity of liquid in the container and the gauge may be directly calibrated to show this quantity. It will furthermore be apparent that the pressure could be utilized to control the quantity of liquid in the container if desired.

Also, piston 49 could be valved and arranged to be drawn upwardly from its lowermost position to reduce the system pressure. The lifting force required as well as the pressure on gauge 52 would indicate the free air space in container 45. Further, the distance piston 49 could be moved upon application of a fixed force would be another manner of obtaining the volume of air space in container 45. Still another approach to this system would be to measure the distance piston 49 must be moved to reach a predetermined reading of gauge 52. With any of these arrangements provisions could be made to effect other operations as a result of the readings or measurements obtained.

In the system of Figure 4, the quantity of non-gaseous material, either liquid or solid in the container 53 is to be measured. The container is connected through a valve 54 to an atmospheric vent and through a valve 55 to a tank of known size. The tank 56 is connected through a valve 57 to an air pump 58 and a gauge 59 is provided to indicate the pressure in the tank.

In operation of this system, the tank is filled with air to a predetermined pressure with the valve 55 closed after which the valve 57 is closed. During this time valve 54 is open to vent the container 53. For a measurement, the valve 54 is closed and the valve 55 is opened to connect the tank to the container 53 in a closed system. The air in the tank 56 is at a pressure other than atmospheric pressure and will equalize with the tank 53 to cause a change in pressure in the closed space comprised by the container 53, the tank 56 and the connecting pipe. The change in pressure in this space, as indicated by the gauge 59 constitutes a measurement of the free volume of space and accordingly of the quantity of non-gaseous material in the container 53.

This system is also applicable to measuring the free space in container 53 when container 53 is a closed unit operating at a pressure other than atmospheric pressure. In this case no pump is required, valve 57 is open to the atmosphere at its connection opposite tank 56, valve 54 is left closed and unused. In this application valve 57 is closed off from atmosphere when a reading is to be taken. Valve 55, normally closed, is then opened. The pressure change indicated by gauge 59 will then be an accurate means of determining the free space and accordingly the non-gaseous contents of container 53.

While several embodiments of the invention have been shown and described in detail, it will be understood that these are illustrative only and are not to be taken as a definition of the scope of the invention, reference being had for this purpose to the appended claims.

What is claimed is:

1. Apparatus for maintaining a selected quantity of liquid in an enclosed space including in combination, a closed container for housing such liquid and air, an inlet port communicating with the interior of said container, a vertically disposed cylinder having an aperture therein communicating with said inlet port to expose the interior of said container to atmospheric pressure, a liquid supply chamber connected to said cylinder for supplying a liquid thereto and a piston of a selected mass movable downwardly in said cylinder solely under the force of gravity to close said aperture and force an additional amount of liquid into said container under a predetermined pressure until the pressure of air in said container reaches said predetermined pressure.

2. Apparatus for maintaining a selected quantity of liquid in an enclosed space including in combination, a closed container for housing such liquid and air, means forming an inlet port communicating with the interior of said container, a cylinder having a first aperture communicating with said inlet port and having a second aperture exposed to atmospheric pressure, a storage chamber for said liquid, a piston movable in said cylinder and having a passage extending therethrough with a check valve therein, and means for moving said piston to a first position to draw liquid from said chamber into said cylinder, said piston moving towards a second position to close said second aperture and force liquid through said passage and said first aperture into said container under a predetermined pressure until the pressure of the air in said container reaches said predetermined pressure.

3. Apparatus for maintaining a selected quantity of liquid in an enclosed space including in combination, a closed container for housing such liquid and air, an inlet port communicating with the interior of said container, a storage chamber for said liquid, a vertically disposed cylinder having a first side aperture communicating with said inlet port, having a second side aperture exposed to atmospheric pressure, and having a bottom port with a check valve therein communicating with said storage chamber, a piston of a selected mass movable in said cylinder and having a passage extending therethrough with a check valve therein, means for moving said piston to its upper position to draw liquid from said storage chamber through said bottom port and into said cylinder, and said piston moving towards its lower position solely by the force of gravity to close said second aperture and force liquid through said passage and first aperture into said container under a predetermined pressure, and such downward motion continuing until the pressure of air in said container reaches said predetermined pressure.

4. Apparatus for maintaining a selected quantity of liquid in an enclosed space including in combination, a closed container structure for housing liquid and air and including first and second portions, said container structure including conduit means forming at least one opening connecting said first and second portions thereof for permitting flow of air therebetween to equalize the pressure therein, an inlet port communicating with the interior of said first portion of said container structure, a cylinder having a first aperture therein communicating with said inlet port and having a second aperture exposed to atmospheric pressure, a storage chamber for the liquid connected to said cylinder, a piston movable in said cylinder and having a passage extending therethrough with a check valve therein, and means for moving said piston from a first position to draw liquid from said chamber into said cylinder, said piston moving towards a second position to close said second aperture and force liquid through said passage and said first aperture into said first container portion under a predetermined pressure until the pressure of air in said container structure reaches said predetermined pressure, said conduit means including a portion at a predetermined level and providing for flow of liquid from said first portion of said container structure to said second portion thereof when the liquid in said first portion reaches the predetermined level, said first aperture being open when said piston is in said first position to permit liquid in said first container portion which does not flow to said second container portion to return through said cylinder to said storage chamber.

5. Apparatus for maintaining a selected quantity of liquid in an enclosed space including in combination, a closed container structure for housing liquid and air including first and second portions, said container structure including conduit means forming a passage connecting said first and second portions thereof for permitting flow of air therebetween to equalize the pressure therein, an inlet port communicating with the interior of said first portion of said container structure, a supply mechanism having a liquid supply chamber and a discharge aperture communicating with said inlet port, said supply mechanism operating in a cycle to initially open said discharge aperture to atmospheric pressure to thereby expose the interior of said container structure to atmospheric pressure, and then close said discharge aperture to atmospheric pressure and force additional liquid from said supply chamber through said aperture into said first container portion under a predetermined pressure until the pressure of air in said container structure reaches said predetermined pressure, said conduit means including syphon means providing for flow of liquid from said first portion of said container structure to said second portion thereof when the liquid in said first portion reaches a predetermined level, said aperture being open during the initial portion of the operating cycle of said supply mechanism to permit the return of liquid from said first container portion which does not flow through said passage to said second container portion.

6. Apparatus for maintaining a selected quantity of non-gaseous material in an enclosed space from which variable amounts are withdrawn at random including in combination, a closed container for housing such material and air, said container including upper and lower portions and conduit means interconnecting said portions, a vertically disposed cylinder having a first aperture communicating with said upper container portion and having a second aperture exposed to atmospheric pressure, a storage chamber for said material communicating with said cylinder, a piston movable in said cylinder, and means operating cyclically for raising said piston to a first position to draw material from said chamber into said cylinder, said piston moving downwardly by gravity towards a second position to close said second aperture and force material from said cylinder through said first aperture into said upper container portion under a predetermined pressure, said piston forcing material into said upper container portion on each downward movement thereof until the pressure of the air in said container reaches said predetermined pressure, said conduit means including means for transferring liquid from said upper container portion to said lower container portion when the material in said upper portion reaches a predetermined level, with the material not being so transferred being returned to said storage chamber.

7. Apparatus for maintaining a selected quantity of liquid in an enclosed space from which variable amounts are withdrawn at random including in combination, a closed container for housing such liquid and air, said container including upper and lower portions and conduit means interconnecting said portions, a vertically disposed cylinder having a first aperture communicating with said upper container portion and having a second aperture exposed to atmospheric pressure, a storage chamber for said liquid communicating with said cylinder, a piston movable in said cylinder, and means operating cyclically for raising said piston to a first position to draw liquid from said chamber into said cylinder, said piston moving downwardly by gravity towards a second position to close said second aperture and force liquid from said cylinder through said first aperture into said upper container portion under a predetermined pressure, said piston forcing liquid into said upper container portion on each downward movement thereof until the pressure of the air in said container reaches said predetermined pressure, said conduit means including syphon means for transferring substantially all the liquid in said upper container portion to said lower container portion when the liquid in said upper portion reaches a predetermined level.

8. Apparatus for maintaining a selected quantity of non-gaseous material in a container from which variable amounts are withdrawn at random, and in which the remaining space is filled with a gas, said apparatus including in combination, conduit means extending upwardly from the container and communicating with the interior thereof, said conduit means including a chamber having an outlet communicating with the container, storage means for containing a supply of the material, material supply means connected to said storage means and said chamber for supplying material from said storage means to said chamber, control means operatively connected to said supply means for providing intermittent operation thereof, said supply means operating in repeating cycles to force portions of material into said chamber until the pressure of the gas in the container and said chamber reaches a predetermined limit during one operation of said supply means, said outlet being at a predetermined position in said chamber so that material in said chamber is irreversibly transferred to the container when the material in said chamber reaches the level of said outlet.

9. Apparatus for maintaining a selected quantity of non-gaseous material in a container from which variable amounts are withdrawn at random, and in which the remaining space is filled with a gas, said apparatus including in combination, conduit means extending upwardly from the container and communicating with the interior thereof, said conduit means including a supply chamber having an outlet communicating with the container, storage means for containing a supply of the material, material supply means connected to said storage means and said supply chamber for supplying material from said storage means to said chamber, control means operatively connected to said supply means for providing intermittent operation thereof, said supply means operating in repeating cycles to force portions of material into said chamber until the pressure of the gas in the container and said chamber reaches a predetermined limit during one operation of said supply means, said outlet being positioned in said supply chamber so that material is transferred from said chamber to the container only when the material in said chamber reaches a predetermined level therein, said material supply means acting during each cycle to vent said supply chamber to a reference pressure, to close said chamber when material is forced therein, and to return untransferred material in said chamber to said storage means.

References Cited in the file of this patent
UNITED STATES PATENTS

| | | |
|---|---|---|
| 1,201,660 | Weatherhead et al. | Oct. 17, 1916 |
| 1,508,969 | Guichard | Sept. 16, 1924 |
| 1,644,378 | Hirschler | Oct. 4, 1927 |
| 1,786,231 | Dick | Dec. 23, 1930 |
| 1,865,561 | Furgason | July 5, 1932 |
| 1,885,926 | Lewis | Nov. 1, 1932 |
| 2,116,636 | Neumann | May 10, 1938 |
| 2,132,364 | Thompson | Oct. 4, 1938 |
| 2,161,510 | Fischel | June 6, 1939 |
| 2,219,656 | Miller | Oct. 29, 1940 |
| 2,381,821 | Helleberg | Aug. 7, 1945 |